United States Patent Office 3,420,871
Patented Jan. 7, 1969

3,420,871
ANTHRANILIC ACID ESTERS
Robert Allan Scherrer and Franklin Willard Short, Ann Arbor, Mich., assignors to Parke, Davis & Company, Detroit, Mich., a corporation of Michigan
No Drawing. Continuation-in-part of application Ser. No. 240,706, Nov. 28, 1962. This application Sept. 1, 1964, Ser. No. 393,710
U.S. Cl. 260—472
Int. Cl. C07c 101/68
6 Claims

ABSTRACT OF THE DISCLOSURE

Amino esters of N-phenylanthranilic acids substituted at the 2- and 3-positions by halogen or methyl and optionally substituted at the 6-position by chlorine; and acid-addition and quaternary ammonium salts. The compounds have anti-inflammatory activity and can be produced by esterifying a substituted N-phenylanthranilic acid or one of its derivatives with an aminoalcohol or one of its derivatives.

This is a continuation-in-part of our copending application Ser. No. 240,706, filed Nov. 28, 1962, now abandoned; which latter application was a continuation-in-part of our application Ser. No. 82,170, filed Jan. 12, 1961, now abandoned.

This invention relates to novel anthranilic acid esters and to methods for producing the same. More particularly, the invention relates to aminoalkyl N-(2,3-disubstituted phenyl)-anthranilates and to aminoalkyl N-(2,3,6-trisubstituted phenyl)-anthranilates of the formula

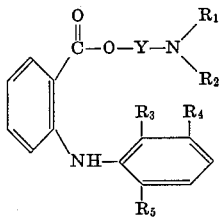

where Y is an alkylene radical containing from 2 to 4 carbon atoms inclusive, $R_1$ and $R_2$ are the same or different and represent methyl or ethyl groups, any two of Y, $R_1$, and $R_2$ being combinable to form a cyclic structure with the nitrogen atom to which they are attached, $R_3$ and $R_4$ are the same or different and represent halogen or a methyl group, and $R_5$ represents hydrogen or chlorine; and to acid-addition salts and quaternary ammonium salts thereof. When either $R_3$ or $R_4$ represents halogen, it is preferably chlorine. $R_3$ and $R_4$ can also represent other halogens such as fluorine and bromine.

In accordance with the invention, anthranilates of the above formula and salts thereof are produced by esterifying an N-(2,3-disubstituted phenyl)-anthranilic acid or an N-(2,3,6-trisubstituted phenyl)-anthranilic acid of the formula

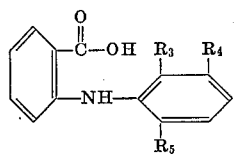

or a reactive derivative thereof with an aminoalcohol of the formula

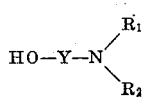

or a reactive derivative thereof; where Y, $R_1$, $R_2$, $R_3$, $R_4$ and $R_5$ have the same significance as given above. This esterification can be carried out in a number of ways. One of the preferred methods involves reacting the N-(2,3-disubstituted phenyl)-anthranilic acid or the N-(2,3,6-trisubstituted phenyl)-anthranilic acid with an aminoalkyl halide of the formula

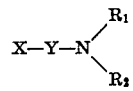

where X is a halogen atom, preferably chlorine or bromine, and Y, $R_1$ and $R_2$ have the same significance as given above. The aminoalkyl halide is preferably utilized in the form of the corresponding hydrohalide salt. The reaction is usually carried out in the presence of one or more equivalents of a substance having a greater base strength than the aminoalkyl halide, and the use of added base is especially important if the aminoalkyl halide is used in the form of a hydrohalide salt. Some examples of suitable basic compounds are tertiary amines such as triethylamine, N-ethylmorpholine, N-ethylpiperidine and inorganic bases such as the alkali metal carbonates, alkali metal bicarbonates, alkaline earth metal carbonates, alkaline earth metal oxides and the like. The reaction is carried out under substantially anhydrous conditions and in an inert organic solvent such as N,N-dimethylformamide, benzene, xylene, toluene and the like. The relative quantities of the reactants are not particularly critical. Usually, the N-(2,3-disubstituted phenyl)-anthranilic acid or the N-(2,3,6-trisubstituted phenyl)-anthranilic acid and the aminoalkyl halide are used in approximately equivalent quantities. When the free anthranilic acid and the free base of the aminoalkyl halide are so used, approximately one equivalent of a basic compound is employed and the desired aminoalkyl N-(2,3-disubstituted phenyl)-anthranilate or aminoalkyl N-(2,3,6-trisubstituted phenyl)-anthranilate obtained in the reaction mixture as the free base. Alternatively when a hydrohalide salt of the aminoalkyl halide is employed, approximately two equivalents of the basic compound are preferably used and the anthranilate obtained in the reaction mixture as the free base. The temperature of the reaction is not critical and may be varied from about 50 to 125° C. The preferred reaction temperature is in the neighborhood of 100° C., that is between about 85 and 110° C.

The esterification can also be carried out by reacting an acid halide of the N-(2,3-disubstituted phenyl)-anthranilic acid or N-(2,3,6-trisubstituted phenyl)-anthranilic acid of the formula

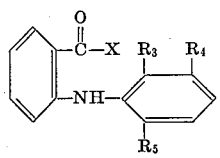

with an aminoalcohol of the formula

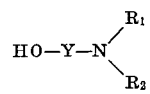

where X is a halogen atom, preferably a chlorine atom, and Y, $R_1$, $R_2$, $R_3$, $R_4$ and $R_5$ have the same significance as given above. The reaction can be carried out by dissolving the reactants in an inert organic solvent and allowing the reaction mixture to stand at ordinary temperature that is, 20 to 35° C. Some of the organic solvents which can be used for the reaction are aromatic hydrocarbons such as benzene, xylene and toluene; aliphatic hydrocarbons such as pentane and petroleum ether; ethers such as diethyl ether, dibutyl ether and dioxane, and other solvents such as N,N-dimethylformamide. The relative quantities of the two reactants are not critical but it is preferable to use approximately two equivalents of the aminoalcohol for each equivalent of the acid chloride of the N-(2,3-disubstituted phenyl)-anthranilic acid or N-(2,3,6-trisubstituted phenyl)-anthranilic acid.

The aminoalkyl N-(2,3-disubstituted phenyl)-anthranilates and the aminoalkyl N-(2,3,6-trisubstituted phenyl)-anthranilates and their pharmaceutically-acceptable acid-addition salts and quarternary ammonium salts of the invention possess a high degree of anti-inflammatory activity and hence are of value in mitigating the symptoms associated with rheumatic, arthritic and other inflammatory conditions as well as preventing or suppressing the occurrence of inflammation. They are preferably administered by the oral route. The pharmaceutically-acceptable acid-addition salts are preferred. Some examples of such salts which can be prepared either as described above or by reaction of the free bases with the corresponding acid are the mineral acid salts such as the hydrochloride, hydrobromide, sulfate, perchlorate, phosphate and hydriodide, the organic acid salts such as the acetate, propionate, citrate, tartrate, benzoate, naphthoate and maleate; and salts with other strong acids such as the sulfamate, benzene-sulfonate atnd p-toluenesulfonate. The pharmaceutically-acceptable quarternary ammonium salts can be prepared by reaction of the free bases with an ester such as methyl bromide, methyl iodide, or ethyl iodide. The compounds of the invention can be combined with either a solid or liquid carrier or diluent and made available in varying amounts in such conventional pharmaceutical forms as tablets, dragées, capsules, powders, suspensions and solutions. Preferred compounds of the invention are those in which Y is an alkylene radical containing from 2–4 carbon atoms inclusive, and each of $R_1$ and $R_2$ represents methyl or ethyl. However, the compounds of the invention wherein any two of Y, $R_1$, and $R_2$ are combined to form a cyclic structure with the nitrogen atom to which they are attached also exhibit useful anti-inflammatory activity.

The invention is illustrated by the following examples.

Example 1

14.4 g. of 2-dimethylaminoethyl chloride hydrochloride, 28.2 g. of N-(2,3-dichlorophenyl)-anthranilic acid, 20.2 g. of triethylamine and 125 ml. of N,N-dimethylformamide is heated at 90 to 100° C. for twenty-four hours, cooled and diluted with about 250 ml. of ether. The precipitate of triethylamine hydrochloride is removed by filtration and the filtrate extracted with an excess of dilute hydrochloric acid. The organic layer is discarded, the acidic aqueous extract is made basic with solid sodium carbonate and the alkaline solution extracted with ether. The ether extract is dried over sodium sulfate and the solution containing the free base of 2-dimethylaminoethyl N-(2,3-dichlorophenyl)-anthranilate treated with an excess of gaseous hydrogen chloride. The insoluble 2-dimethylamino ethyl N-(2,3-dichlorophenyl)-anthranilate hydrochloride is collected and purified by several recrystallizations from ethanol; M.P. 177.5–178.5° C.

The free base of 2-dimethylaminoethyl N-(2,3-dichlorophenyl)-anthranilate can be prepared by dissolving the hydrochloride salt in warm water, alkalizing the solution with 5% sodium hydroxide solution and extracting with ether. The ether extract is dried and the ether removed by distillation to obtain the desired free base.

A suspension of 7 g. of 2-dimethylaminoethyl N-(2,3-dichlorophenyl)-anthranilate hydrochloride in acetone is heated almost to boiling and then treated with 2.6 g. of potassium carbonate followed by 2 g. of 50% sodium hydroxide solution. A precipitate of inorganic salt is collected on a filter and discarded. A solution of 3.8 g. of methyl iodide in acetone is added and the reaction mixture allowed to stand at room temperature for 3 days. The insoluble 2-dimethylaminoethyl N-(2,3-dichlorophenyl)-anthranilate methiodide is collected on a filter. An additional quantity of the same product is obtained by adding petroleum ether to the filtrate; M.P. 209–210° C. following crystallization from ethanol-petroleum ether.

Example 2

A mixture consisting of 28.2 g. of N-(2,3-dichlorophenyl)-anthranilic acid, 17.2 g. of 3-dimethylamino-2-methylpropyl chloride hydrochloride, 28 ml. of triethylamine and 125 ml. of N,N-dimethylformamide is heated for twenty-four hours at 90 to 100° C., cooled and diluted with ether. The precipitate of triethylamine hydrochloride is removed by filtration and the filtrate extracted with an excess of dilute hydrochloric acid. The organic layer is discarded, the acidic aqueous extract is made basic with solid sodium carbonate and the alkaline solution extracted with ether. The ether extract is dried over sodium sulfate and the solution containing the free base of 3-dimethylamino - 2 - methylpropyl N-(2,3-dichlorophenyl)-anthranilate treated with an excess of gaseous hydrogen chloride. The insoluble 3-dimethylamino-2-methylpropyl N-(2,3-dichlorophenyl)-anthranilate hydrochloride is collected and purified by recrystallization from ethanol; M.P. 172–74° C. (softens at 167–70° C.).

If the ether solution containing the free base of 3-dimethylamino - 2 - methylpropyl N-(2,3-dichlorophenyl)-anthranilate is treated with an excess of hydrogen bromide instead of hydrogen chloride one obtains the hydrobromide salt. Alternatively, if one equivalent of benzenesulfonic acid is used instead of hydrogen chloride or hydrogen bromide one obtains 3-dimethylamino-2-methylpropyl N-(2,3-dichlorophenyl)-anthranilate benzenesulfonate.

Example 3

A mixture consisting of 14.4 g. of 2-dimethylaminoethyl chloride hydrochloride, 24.1 g. of N-(2,3-dimethylphenyl)-anthranilic acid, 20.2 g. of triethylamine, 100 ml. of N,N-dimethylformamide and 35 ml. of absolute ethanol is heated at 85 to 90° C. for nineteen hours, cooled and the insoluble triethylamine hydrochloride collected by filtration. The triethylamine hydrochloride is washed with ether and the ether washings added to the reaction mixture filtrate which causes more triethylamine hydrochloride to separate. The triethylamine hydrochloride is removed from the diluted reaction mixture by filtration and the filtrate shaken with an excess of dilute hydrochloric acid. The organic layer is discarded and the acidic aqueous extract made basic with solid sodium carbonate. The basic solution is extracted with ether and the ether solution containing the free base of the desired 2-dimethylaminoethyl N-(2,3-dimethylphenyl)-anthranilate dried over sodium sulfate. The ether solution of the free base is treated with an excess of dry hydrogen chloride and the oily hydrochloride salt which separates from the solution collected and recrystallized from acetone after charcoaling. The 2-dimethylaminoethyl N-(2,3-dimethylphenyl)-anthranilate hydrochloride so obtained can be purified further if desired by recrystallization from absolute ethanol-petroleum ether mixture; M.P. 210–212° C.

3.0 g. of 2-dimethylaminoethyl N-(2,3-dimethylphenyl)-anthranilate hydrochloride is dissolved in warm water and the resulting solution made alkaline with 5% sodium hydroxide solution. The basic solution is extracted with ether, the ether extract dried over sodium sulfate and an equivalent amount of sulfamic acid in ethanol added to the solution. The solvents are evaporated to obtain the desired 2-dimethylaminoethyl N-(2,3-dimethylphenyl)-anthranilate sulfamate.

Example 4

A mixture consisting of 18.6 g. of 3-diethylaminopropyl chloride hydrochloride, 24.1 g. of N-(2,3-dimethylphenyl)-anthranilic acid, 20.2 g. of triethylamine and 125 ml. of N,N-dimethylformamide is heated at 90° C. for about twenty hours and the reaction mixture cooled. The triethylamine hydrochloride which separates is collected and washed with ether. The ether washings are added to the reaction mixture filtrate and the additional triethylamine hydrochloride which separates due to the addition is removed by filtration. The filtrate is shaken with an excess of dilute hydrochloric acid and the organic layer discarded. The acidic aqueous extract is made alkaline by the addition of solid sodium carbonate and extracted with ether. The ether extract is dried over magnesium sulfate and the ether solution containing the free base of the desired 3-diethylaminopropyl N-(2,3-dimethylphenyl)-anthranilate treated with an excess of dry hydrogen chloride. The hydrochloride salt of 3-diethylaminopropyl N-(2,3-dimethylphenyl)-anthranilate which separates is collected and purified by recrystallization from absolute ethanol; M.P. 189–191° C.

If desired, an equivalent amount of 3-diethylaminopropyl bromide hydrobromide can be substituted for the 3-diethylaminopropyl chloride hydrochloride used in the above procedure. Also, if desired, one may use the free base of the 3-diethylaminopropyl chloride or 3-diethylaminopropyl bromide in the above procedure. In this latter case it is only necessary to use one half as much triethylamine catalyst.

Example 5

A mixture consisting of 15.0 g. of the acid chloride of N-(2,3-dichlorophenyl)-anthranilic acid, 15.7 g. of 2-diethylamino-1-methylethanol and 150 ml. of benzene is allowed to stand overnight at room temperature. The reaction mixture is diluted with ether and then washed first with 0.5 N sodium hydroxide solution and then with a saturated solution of sodium chloride. The organic layer is dried over sodium sulfate and the solvents removed by evaporation in vacuo. The residual 2-diethylamino-1-methylethyl N-(2,3-dichlorophenyl)-anthranilate free base is taken up in ether and the solution treated with an excess of isopropanolic hydrogen chloride. The hydrochloride salt of 2-diethylamino - 1 - methylethyl N-(2,3-dichlorophenyl)-anthranilate is collected and purified by recrystallization from water; M.P. 151–153° C.

Example 6

A mixture consisting of 15 g. of the acid chloride of N-(2,3-dichlorophenyl)-anthranilic acid, 14 g. of 2-diethylaminoethanol and 150 ml. of benzene is allowed to stand overnight at room temperature. The reaction mixture is washed with 2 N sodium hydroxide solution and then with several portions of saturated sodium chloride. The organic layer is evaporated in vacuo and the residual 2-diethylaminoethyl N-(2,3 - dichlorophenyl) - anthranilate taken up in ether. Excess isopropanolic hydrogen chloride is added to the ether solution of the free base and the hydrochloride salt which precipitates is collected. The 2-diethylaminoethyl N - (2,3 - dichlorophenyl)-anthranilate hydrochloride is washed with ether and purified by recrystallization from chloroform-ether mixture; M.P. 172–174° C.

If desired, one can add an excess of dry hydrogen bromide to the ether solution of the free base of 2-diethylaminoethyl N-(2,3-dichlorophenyl)-anthranilate prepared above to obtain the hydrobromide salt. Alternatively, by adding an equivalent amount of glacial acetic acid to the ether solution of the free base and evaporating the ether one obtains 2-diethylaminoethyl N-(2,3-dichlorophenyl)-anthranilate acetate.

Example 7

A mixture consisting of 15 g. of the acid chloride of N-(2,3-dichlorophenyl)-anthranilic acid, 15.7 g. of 3-diethylaminopropanol and 150 ml. benzene is allowed to stand overnight at room temperature. The reaction mixture is diluted with ether and then washed with three portions 0.5 N sodium hydroxide solution and finally with three portions of saturated sodium chloride solution. The organic layer is separated, dried over sodium sulfate, and the solvents removed by distillation. The residual oily 3-diethylaminopropyl N-(2,3-dichlorophenyl) - anthranilate free base is taken up in warm ether and the solution treated with an excess of isopropanolic hydrogen chloride. The oily hydrochloride salt which separates on cooling slowly solidifies. The hydrochloride salt is collected and dried in vacuo. After refluxing with petroleum ether the hydrochloride melts at 119–134° C.

The 3 - diethylaminopropyl N - (2,3 - dichlorophenyl)-anthranilate hydrochloride prepared as described above is added to ether and to this mixture an excess of perchloric acid (70%) in methanol is added very slowly. After the addition has been completed, a small amount of methanol is added to dissolve any crystals, the solution warmed and then allowed to cool slowly. The crystalline 3-diethylaminopropyl N-(2,3-dichlorophenyl)-anthranilate perchlorate which separates is collected and purified by recrystallization from methanol ether mixture; M.P. 146–148.5° C.

If desired, an equivalent amount of the acid chloride of N-(2-chloro-3-methylphenyl)-anthranilic acid can be substituted for the acid chloride of N-(2,3-dichlorophenyl)-anthranilic acid used in the above procedure. In this case the product is 3-diethylaminopropyl N-(2-chloro-3-methylphenyl)-anthranilate and its hydrochloride and perchlorate salts.

Example 8

A mixture consisting of 26.1 g. of N-(2-chloro-3-methylphenyl)-anthranilic acid, 13.0 g. of 2-diethylaminoethyl chloride, 10.5 g. of triethylamine and 150 ml. of toluene is heated at 100° C. for twenty-four hours, cooled and diluted with ether. The precipitated triethylamine hydrochloride is removed by filtration and the filtrate extracted with an excess of dilute hydrochloric acid. The organic layer is discarded and the acidic aqueous extract is made basic with solid potassium carbonate. The alkaline solution is extracted with ether, the ether extract dried over sodium sulfate and the solution containing the free base of the desired 2-diethylaminoethyl N-(2-chloro-3-methylphenyl)-anthranilate treated with an excess of gaseous hydrogen chloride. The hydrochloride salt of 2-diethylaminoethyl N-(2-chloro - 3 - methylphenyl) - anthranilate which separates from the solution is collected and purified by recrystallization from absolute ethanol.

Example 9

A mixture of 15.0 g. of N-(2,3,6-trichlorophenyl)-anthranilic acid, 8.2 g. of 2-diethylaminoethyl chloride hydrochloride, 9.6 g. of triethylamine and 60 ml. of N,N-dimethylformamide is heated at 90–110° C. with stirring for twenty-four hours. The reaction mixture is cooled and diluted with ether and the insoluble triethylamine hydrochloride which separates is removed by filtration. The filtrate is acidified with dilute hydrochloric acid and the aqueous phase is separated from the organic phase which is then discarded. The aqueous solution is made basic with solid sodium carbonate and extracted with ether. The ether solution which contains 2-diethylaminoethyl N-(2,3,6-trichlorophenyl)-anthranilate is separated, washed with water and with saturated sodium chloride solution, dried over sodium sulfate, filtered, and treated with an excess of hydrogen chloride. The insoluble hydrochloride salt separates first as an oil which tends to solidify upon treatment with petroleum ether; M.P. 155–164° C. following crystallization from benzene-cyclohexane, isopropyl alcohol-petroleum ether, ethanol and ethanol-ether.

Example 10

A mixture of 15.0 g. of N-(2,6-dichloro-3-methylphenyl)-anthranilic acid, 8.0 g. of 3-dimethylaminopropyl chloride hydrochloride, 10.3 g. of triethylamine and 65 ml. of N,N-dimethylformamide is heated with continuous stirring for twenty-four hours at 100° C. The reaction mixture is cooled and diluted with ether and the insoluble triethylamine hydrochloride which separates is removed by filtration. The filtrate is acidified with dilute hydrochloric acid and the aqueous solution is separated, made alkaline with sodium carbonate solution and extracted with ether. The ether extract which contains 3-dimethylaminopropyl N-(2,6-dichloro-3-methylphenyl) - anthranilate is washed several times with water and with saturated sodium chloride solution, dried over sodium sulfate, filtered and evaporated to give the free base as an oily product. The free base is redissolved in 200 ml. of ether and treated with an excess of hydrogen chloride. The insoluble hydrochloride is collected on a filter; M.P. 214–215° C. following crystallization from ethanol.

By the foregoing procedure, with the substitution of 8.6 g. of N-(β-chloroethyl)pyrrolidine hydrochloride for the 3-dimethylaminopropyl chloride hydrochloride, the products obtained are 2-pyrrolidinoethyl N-(2,6-dichloro-3-methylphenyl)-anthranilate and its hydrochloride.

By the foregoing procedure, with the substitution of 15 g. of N-(2-methyl-3,6-dichlorophenyl)-anthranilic acid for the N-(2,6-dichloro-3-methylphenyl)-anthranilic acid, the products obtained are 3-dimethylaminopropyl N-(2-methyl-3,6-dichlorophenyl)-anthranilate and its hydrochloride.

Example 11

A solution of 17.3 g. of N-methyl-3-piperidinol in 50 ml. of benzene is gradually added with stirring to 15 g. of the acid chloride of N-(2,3-dichlorophenyl)-anthranilic acid in 450 ml. of benzene. The reaction mixture is allowed to stand at room temperature for eighteen hours and is then diluted with 500 ml. of ether, washed with several portions of 0.5 N sodium hydroxide solution, dried over sodium sulfate, filtered and concentrated to dryness under reduced pressure. The oily residue of N-methyl-3-piperidyl N-(2,3-dichlorophenyl)-anthranilate is dissolved in ether and treated with an excess of hydrogen chloride. The insoluble hydrochloride is collected; M.P. 210–212° C. following crystallizations from methanol-ether.

Example 12

A mixture consisting of 2.1 g. of N-(2,3-dibromophenyl)-anthranilic acid, 0.98 g. of 2-diethylaminoethyl chloride hydrochloride, 1.14 g. of triethylamine and 8 ml. of N,N-dimethylformamide is stirred and heated for twenty-four hours at 100–110° C. The mixture is cooled and diluted with ether, and triethylamine hydrochloride is removed by filtration. The filtrate is washed with sodium carbonate solution and then acidified with hydrochloric acid. The insoluble 2-diethylaminoethyl N-(2,3-dibromophenyl)-anthranilate hydrochloride is collected on a filter; M.P. 208–209.5° C. following crystallization from ethanol.

Example 13

A mixture of 5.0 g. of N-(2-fluoro-3-chlorophenyl)-anthranilic acid, 3.3 g. of 2-diethylaminoethyl chloride hydrochloride, 3.9 g. of triethylamine and 20 ml. of N,N-dimethylformamide is stirred and heated for twenty-two hours at 110° C. The mixture is cooled, diluted with ether, and filtered to remove insoluble triethylamine hydrochloride. The ethereal filtrate is washed with sodium carbonate solution and with water, dried, and treated with hydrogen chloride. The insoluble 2-diethylaminoethyl N-(2-fluoro-3-chlorophenyl)-anthranilate hydrochloride is collected on a filter; M.P. 168–169° C. following crystallization from ethanol.

The N-(2,3-disubstituted phenyl)-anthranilic acids and the N-(2,3,6-trisubstituted phenyl)-anthranilic acids used as starting materials in the practice of the invention can be prepared by heating together approximately equimolar quantities of potassium o-bromobenzoate, the appropriate 2,3-disubstituted or 2,3,6-trisubstituted aniline and N-ethylmorpholine in the presence of a cupric bromide catalyst and in diethylene glycol dimethyl ether as a solvent. The acid halides of the N-(2,3-disubstituted phenyl)-anthranilic acids and the acid halides of the N-(2,3,6-trisubstituted phenyl)-anthranilic acids used as starting materials can be prepared by reacting the corresponding anthranilic acid with a halogenating agent such as thionyl chloride. The following illustrates these preparative methods.

A mixture consisting of 47.8 g. of potassium o-bromobenzoate, 32.2 g. of 2,3-dichloroaniline, 23 g. of N-ethylmorpholine, 100 ml. of diethylene glycol dimethyl ether and 2 g. of anhydrous cupric bromide is gradually heated with stirring to a temperature slightly above 140° C. The heating is carried out in a nitrogen atmosphere and the temperature maintained above 140° C. for one hour. The mixture is diluted with 100 ml. of diethylene glycol dimethyl ether, cooled below 100° C. and treated with 25 ml. of concentrated hydrochloric acid. The mixture is heated to 110° C. for a few minutes and then diluted with 150 ml. of hot water. The mixture is cooled, the desired crystalline N-(2,3-dichlorophenyl)-anthranilic acid is collected and washed first with cold ethanol-water mixture and finally with ether; M.P. 255.5–256.5° C. The corresponding N-(2,3-dimethylphenyl)-anthranilic acid prepared from 2,3-dimethylaniline melts at 229–230° C. while N-(2-chloro-3-methylphenyl)-anthranilic acid prepared from 2-chloro-3-methylaniline melts at 218–219° C. The isomeric N - (2 - methyl-3-chlorophenyl)-anthranilic acid melts at 207–207.5° C. and is prepared from 2-methyl-3-chloroaniline.

A mixture consisting of 22.7 g. of potassium o-bromobenzoate, 16.6 g. of 2,6-dichloro-3-methylaniline, 12 ml. of N-ethylmorpholine, 60 ml. diethylene glycol dimethyl ether, and 1.0 g. of anhydrous cupric bromide is heated in a nitrogen atmosphere at 145–155° C. for two hours. The reaction mixture is diluted with 60 ml. of diethylene glycol dimethyl ether and acidified with 25 ml. concentrated hydrochloric acid. The acidic mixture is diluted with 100 ml. of water and the liquid phase decanted from the insoluble oil. The insoluble oil is stirred with methanol and the crystalline N-(2,6-dichloro-3-methylphenyl)-anthranilic acid which separates is collected and washed with methanol. The product, after recrystallization from acetone-water mixture, melts at 248–250° C.

A mixture of 40.5 g. potassium o-bromobenzoate, 20.0 g. 3,6-dichloro-2-methylaniline, 2.5 g. calcium hydride and 50 ml. diethylene glycol dimethyl ether is placed in a reaction vessel and the vessel flushed with nitrogen. The reaction mixture is heated to 70° C., 2.0 g. cupric bromide added, and the mixture heated to 157° C. over a period of two hours. Sufficient water is added to decompose any unused calcium hydride and the solution made basic with aqueous sodium hydroxide. The solid which precipitates is collected by filtration and the aqueous alkaline solution extracted with ether. The alkaline solution is then acidified with concentrated hydrochloric acid and the solid N-(2-methyl - 3,6 - dichlorophenyl)-anthranilic acid which precipitates is collected and purified by recrystallization from ethanol-water mixtures; M.P. 232–233° C. The solid product which was filtered from the alkaline solution is dissolved in dimethylformamide and the solution acidified slowly. The product which precipitates is collected, dried, and recrystallized from ethanol-water mixture to obtain an additional quantity of N-(2-methyl-3,6-dichlorophenyl)-anthranilic acid; M.P. 232–233° C. The isomeric N-(2,6-dichloro-3-methylphenyl)-anthranilic acid melts at 248–250° C. and can be prepared similarly from 2,6-dichloro-3-methylaniline. The 2-methyl-3,6-dichloroaniline used as a starting material in the above procedure can be prepared by brominating N-acetyl-2-methyl-3-chloroaniline with bromine in glacial acetic acid to obtain N-acetyl-2-methyl-3-chloro-4-bromoaniline, chlorinating this substance with chlorine in glacial acetic acid to obtain N-acetyl-2-methyl-3,6-dichloro-4-bromoaniline, reducing an ethanol solution of the latter substance using palladium catalyst in the presence of sodium acetate to obtain N-acetyl-2-methyl-3,6-dichloroaniline and removing the N-acetyl group by hydrolysis with aqueous sulfuric acid.

A mixture consisting of 22.8 g. potassium o-bromobenzoate, 9.5 g. 2,3,6-trichloroaniline, 1.0 g. calcium hydride, and 20 ml. diethylene glycol dimethyl ether is placed in a reaction vessel and the vessel flushed with nitrogen. The reaction mixture is heated to 85° C., 1.5 g. cupric bromide added, and the mixture heated to 150° C. over a two and a half hour period. The reaction mixture is cooled, a small amount of water added to decompose any remaining calcium hydride and the reaction mixture made strongly alkaline with 2 N sodium hydroxide. The alkaline solution is extracted with ether, filtered to remove insoluble particles, and acidified with dilute hydrochloric acid. The solid which precipitates is collected, washed several times with hot water to remove any o-bromobenzoic acid and the residual N-(2,3,6-trichlorophenyl)-anthranilic acid dried and recrystallized from ethanol-water mixture; M.P. 219–221° C.

A mixture consisting of 100 g. of N-(2,3-dichlorophenyl)-anthranilic acid and 495 ml. of thionyl chloride is heated at 40 to 50° C. for about two hours. The reaction mixture is concentrated under water pump vacuum keeping the temperature below 60° C., 750 ml. of benzene is added to the residue and the benzene removed by distillation under water pump vacuum keping the temperature below 60° C. to obtain the desired acid chloride of N-(2,3-dichlorophenyl)-anthranilic acid. By the use of any of the other anthranilic acids mentioned in the preceding paragraphs one obtains the corresponding acid chloride.

A mixture of 9.7 g. potassium o-bromobenzoate, 10 g. 2,3-dibromoaniline, 5.1 ml. N-ethylmorpholine, 0.5 g. cupric bromide and 30 ml. diethylene glycol dimethyl ether is heated and stirred in a nitrogen atmosphere at 135–145° C. for one hour. The mixture is diluted with 30 ml. diethylene glycol dimethyl ether and treated successively with 15 ml. concentrated hydrochloric acid and 60 ml. water. The mixture is then chilled and the insoluble N-(2,3-dibromophenyl)-anthranilic acid is collected; M.P. 245–247° C. following crystallization from aqueous acetone.

A mixture consisting of 37.8 g. potassium o-bromobenzoate, 23.0 g. 3-chloro-2-fluoroaniline, 20 ml. N-ethylmorpholine, 2.0 g. cupric bromide, and 75 ml. diethylene glycol dimethyl ether is heated with stirring under a nitrogen atmosphere for one and half hours at 120–140° C. The hot reaction mixture is acidified with 13.4 ml. concentrated hydrochloric acid and the N-ethylmorpholine hydrochloride removed by filtration. The warm filtrate is diluted with 60 ml. water and cooled. The crystalline N-(2-fluoro-3-chlorophenyl)-anthranilic acid which separates is collected and recrystallized first from ethanol and then from benzene; M.P. 209.5–211° C.

We claim:
1. A compound of the class consisting of a free base and its pharmaceutically-acceptable acid-addition and quaternary ammonium salts, said free base having the formula

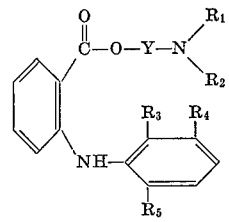

where Y is alkylene of 2–4 carbon atoms inclusive, $R_1$ and $R_2$ are members of the class consisting of methyl and ethyl groups, any two of Y, $R_1$, and $R_2$ being combinable to form a cyclic structure with the nitrogen atom to which they are attached, $R_3$ and $R_4$ are members of the class consisting of halogen and methyl, and $R_5$ is a member of the class consisting of hydrogen and chlorine.

2. 2-dimethylaminoethyl N - (2,3-dichlorophenyl)-anthranilate hydrochloride.

3. 2-diethylaminoethyl N - (2,3-dichlorophenyl) - anthranilate hydrochloride.

4. 2-dimethylaminoethyl N-(2,3-dimethylphenyl) - anthranilate hydrochloride.

5. 2-diethylaminoethyl N - (2,3,6-trichlorophenyl)-anthranilate hydrochloride.

6. 3-dimethylaminopropyl N - (2,6-dichloro-3-methylphenyl)-anthranilate hydrochloride.

References Cited

UNITED STATES PATENTS 2,502,451    4/1950    Goldberg et al. _____ 260—472

LORRAINE A. WEINBERGER, *Primary Examiner.*

L. A. THAXTON, *Assistant Examiner.*

U.S. Cl. X.R.

260—294.3, 326.3, 999